US012592567B2

(12) United States Patent
Yen et al.

(10) Patent No.: US 12,592,567 B2
(45) Date of Patent: Mar. 31, 2026

(54) POWER MANAGEMENT METHOD OF SYSTEM AND RELATED INTERNET DATA CENTER

(71) Applicant: Wiwynn Corporation, New Taipei City (TW)

(72) Inventors: Chia-Hung Yen, New Taipei City (TW); Chun-Hao Chang, New Taipei City (TW); Cheng-Kuang Hsieh, New Taipei City (TW)

(73) Assignee: Wiwynn Corporation, New Taipei City (TW)

( * ) Notice: Subject to any disclaimer, the term of this patent is extended or adjusted under 35 U.S.C. 154(b) by 58 days.

(21) Appl. No.: 18/430,570

(22) Filed: Feb. 1, 2024

(65) Prior Publication Data

US 2025/0062621 A1      Feb. 20, 2025

(30) Foreign Application Priority Data

Aug. 14, 2023    (TW) .................................. 112130471

(51) Int. Cl.
*G06F 1/26*          (2006.01)
*H02J 3/38*          (2006.01)
(52) U.S. Cl.
CPC ................ *H02J 3/38* (2013.01); *G06F 1/263* (2013.01)
(58) Field of Classification Search
CPC .......................................................... G06F 1/32
See application file for complete search history.

(56) References Cited

U.S. PATENT DOCUMENTS

| 7,529,949 B1 * | 5/2009 | Ranganathan ............ G06F 1/28 |
| | | 713/300 |
| 2003/0056125 A1 * | 3/2003 | O'Conner ............... G06F 1/263 |
| | | 713/300 |
| 2010/0038963 A1 * | 2/2010 | Shetty ..................... G06F 1/263 |
| | | 307/62 |
| 2012/0066519 A1 * | 3/2012 | El-Essawy ............. H04L 67/12 |
| | | 713/300 |
| 2012/0091815 A1 * | 4/2012 | Richards, III .......... H02M 1/32 |
| | | 307/80 |
| 2012/0151228 A1 * | 6/2012 | Chao ..................... G06F 1/3206 |
| | | 713/300 |

(Continued)

FOREIGN PATENT DOCUMENTS

| CN | 106502358 A | 3/2017 |
| TW | 201424199 A | 6/2014 |

*Primary Examiner* — Phil K Nguyen
(74) *Attorney, Agent, or Firm* — Winston Hsu

(57)                ABSTRACT

A system includes at least one server and a power supply having multiple power supply units. After system boot-up, all power supply units in the power supply are turned on for supplying power to the at least one server. Next, the maximum output power value of the power supply and the conversion efficiency table containing the relationship between the loading rate and the conversion efficiency of the power supply are acquired, and the real-time conversion efficiency of the power supply is calculated. When it is determined based on the real-time conversion efficiency and the conversion efficiency table of the power supply that the power supply is not currently operating with an optimized conversion efficiency, one or more power supply units in the power supply are turned off or turned on according to a predetermined rule.

11 Claims, 3 Drawing Sheets

(56) References Cited

U.S. PATENT DOCUMENTS

| | | | |
|---|---|---|---|
| 2012/0278644 A1* | 11/2012 | Chen | G06F 1/26 |
| | | | 713/340 |
| 2014/0095900 A1* | 4/2014 | Chen | G06F 1/30 |
| | | | 713/300 |
| 2015/0117077 A1* | 4/2015 | Huang | H02J 1/001 |
| | | | 363/144 |
| 2016/0147276 A1 | 5/2016 | Chen | |
| 2023/0126736 A1* | 4/2023 | Singh | G06F 1/3206 |
| | | | 713/320 |
| 2024/0080359 A1* | 3/2024 | Lei | G06F 1/3203 |

* cited by examiner

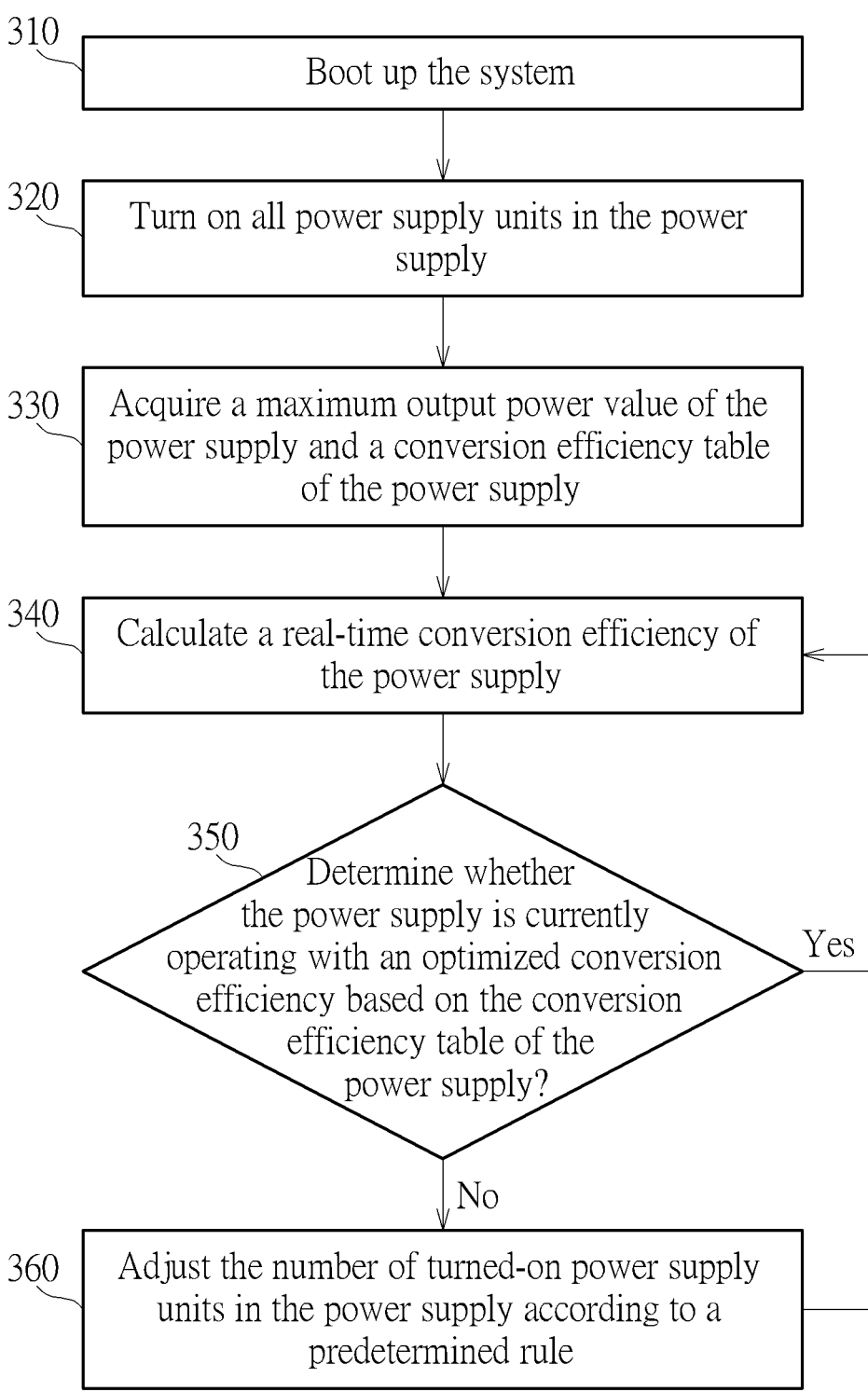

310 — Boot up the system

320 — Turn on all power supply units in the power supply

330 — Acquire a maximum output power value of the power supply and a conversion efficiency table of the power supply 340 — Calculate a real-time conversion efficiency of the power supply 350 — Determine whether the power supply is currently operating with an optimized conversion efficiency based on the conversion efficiency table of the power supply?

Yes

No

360 — Adjust the number of turned-on power supply units in the power supply according to a predetermined rule

FIG. 3

POWER MANAGEMENT METHOD OF SYSTEM AND RELATED INTERNET DATA CENTER

BACKGROUND OF THE INVENTION

1. Field of the Invention

The present invention includes a method of performing power management in a system and a related system, and more particularly, to a method of performing power management in a rack system for maintaining operation with an optimized conversion efficiency and a related rack system.

2. Description of the Prior Art

An Internet data center (IDC) is electronic equipment having many network computers and configure to coordination the operation of each network computer for collectively gather data, store data, process data and transmit data. A typical IDC typically includes many servers for storing data and executing applications, and a user may access the IDC using a remotely-connected computer. For ease of management, the servers are usually centrally disposed in the same rack/tank, via which the server resources may be distributed and managed. Each server in each rack system includes a baseboard manage controller configured to management internal operations and handle the network communication with the IDC.

In a rack system, the utilization rate of each server is determined by its operational mode, current time and the number of users. The workload of the servers may sometimes reach 100% hardware resource utilization rate, and sometimes may be 50% hardware resource utilization rate or less. The above-mentioned hardware resource generally includes processor core, system memory, storage controller, Ethernet controller, and input/output peripheral devices. The power required for operating each server may be centrally supplied by a power distribution unit (PDU) in the rack/tank, or separately supplied by a built-in power supply unit (PSU) of each server. The energy conversion efficiency of the PDU or the PSU is related to the loading rate of the servers. Generally speaking, when the servers are operating with a lower loading rate, the PDU or the PSU has lower energy conversion efficiency, thereby resulting in energy waste.

Therefore, there is a need for a method of performing power management in a rack system for maintaining operation with its optimized conversion efficiency, thereby achieving energy conservation.

SUMMARY OF THE INVENTION

The present invention provides a method of performing power management in a system. The system includes at least one server and a power supply which includes a plurality of power supply units. The method includes turning on all power supply units in the power supply for supplying power to the at least one server; acquiring a maximum output power value of the power supply and a conversion efficiency table of the power supply, wherein the conversion efficiency table contains a relationship between a loading rate of the power supply and a conversion efficiency of the power supply; calculating a real-time conversion efficiency of the power supply; determining whether the power supply is currently operating with an optimized conversion efficiency based on the conversion efficiency table and the real-time conversion efficiency of the power supply; and adjusting a number of turned-on power supply units among the plurality of power supply units in the power supply according to a predetermined rule when determining that the power supply is not currently operating with the optimized conversion efficiency.

The present invention also provides a system which includes a plurality of servers, a power supply comprising a plurality of power supply units, and a rack management controller. The rack management controller is configured to turn on all power supply units in the power supply for supplying power to the plurality of servers after booting-up the system; acquire a maximum output power value of the power supply and a conversion efficiency table of the power supply, wherein the conversion efficiency table contains a relationship between a loading rate of the power supply and a conversion efficiency of the power supply; calculate a real-time conversion efficiency of the power supply; determine whether the power supply is currently operating with an optimized conversion efficiency based on the conversion efficiency table and the real-time conversion efficiency of the power supply; and adjust a number of turned-on power supply units among the plurality of supply units in the power supply according to a predetermined rule when determining that the power supply is not currently operating with the optimized conversion efficiency.

The present invention also provides a system which includes at least one server and a rack management controller. The at least one server includes a power supply comprising a plurality of power supply units and a baseboard management controller configured to control an operation of each power supply unit in the power supply for supplying power to the at least one server. The rack management controller is configured to acquire a maximum output power value of the power supply and a conversion efficiency table of the power supply via the baseboard management controller, wherein the conversion efficiency table contains a relationship between a loading rate of the power supply and a conversion efficiency of the power supply; calculate a real-time conversion efficiency of the power supply; determine whether the power supply is currently operating with an optimized conversion efficiency based on the conversion efficiency table and the real-time conversion efficiency of the power supply; and instruct the baseboard management controller to adjust a number of turned-on power supply units among the plurality of supply units in the power supply according to a predetermined rule when determining that the power supply is not currently operating with the optimized conversion efficiency.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a flowchart illustrating the operation of a system according to an embodiment of the present invention.

DETAILED DESCRIPTION

Figure 1:
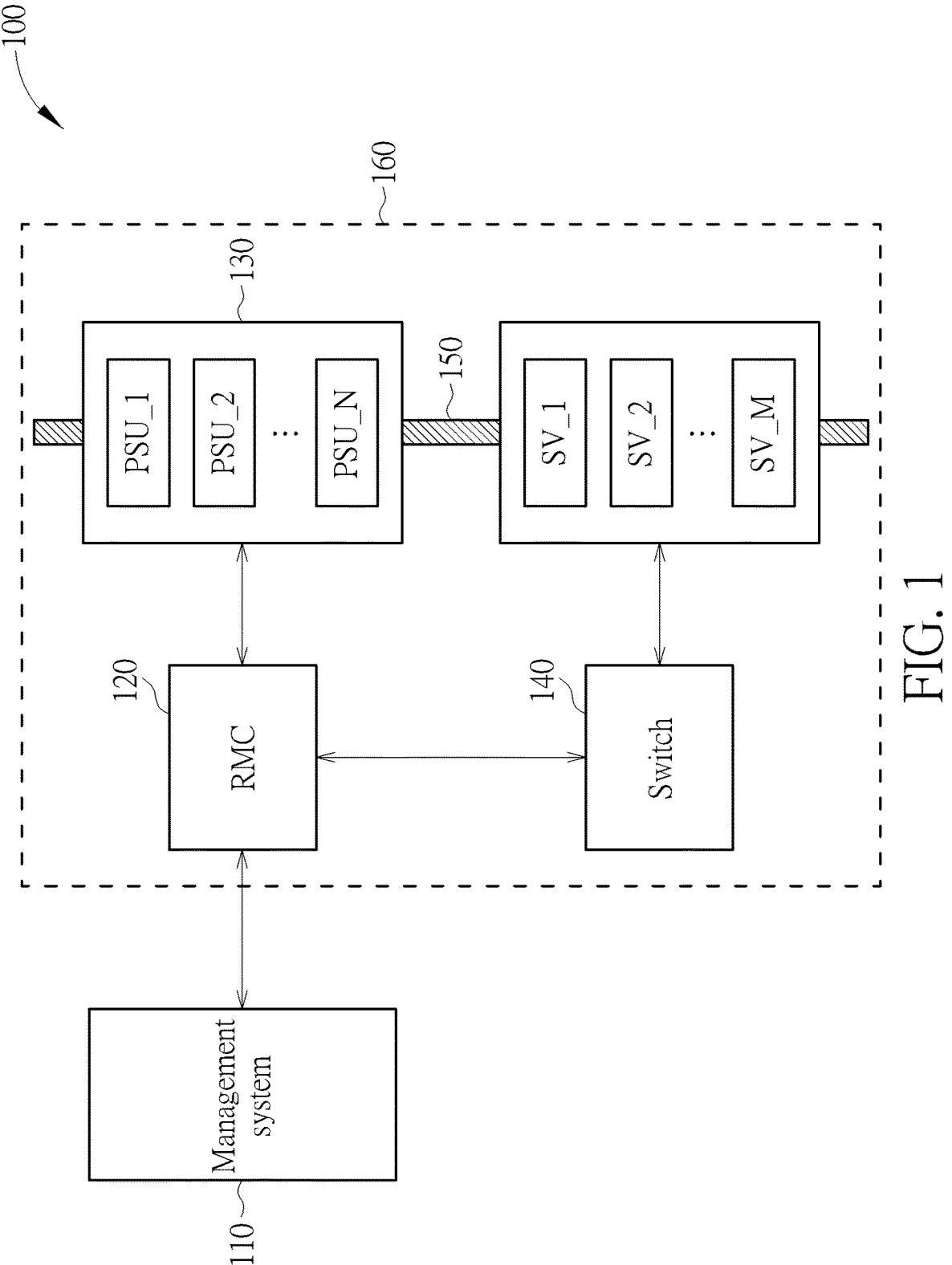
FIG. 1 is a diagram illustrating a system according to an embodiment of the present invention.

FIG. 1 is a diagram illustrating a system 100 according to an embodiment of the present invention. The system 100 may be a rack system which includes a management system 110, a rack management controller (RMC) 120, a power supply 130, a switch 140, a busbar 150, and servers SV_1-SV_M (M is a positive integer). The system 100 adopts a centralized power supplying structure, wherein the power supply 130 includes a plurality of power supply units PSU_1-PSU N (N is an integer larger than 1). The power supplied by the power supply 130 may be transmitted to the servers SV_1-SV_M via the busbar 150. In an embodiment of the present invention, the RMC 120, the power supply 130, the switch 140, the busbar 150 and the servers SV_1-SV_M may be disposed in the same rack/tank 160, but is not limited thereto.

Figure 2:
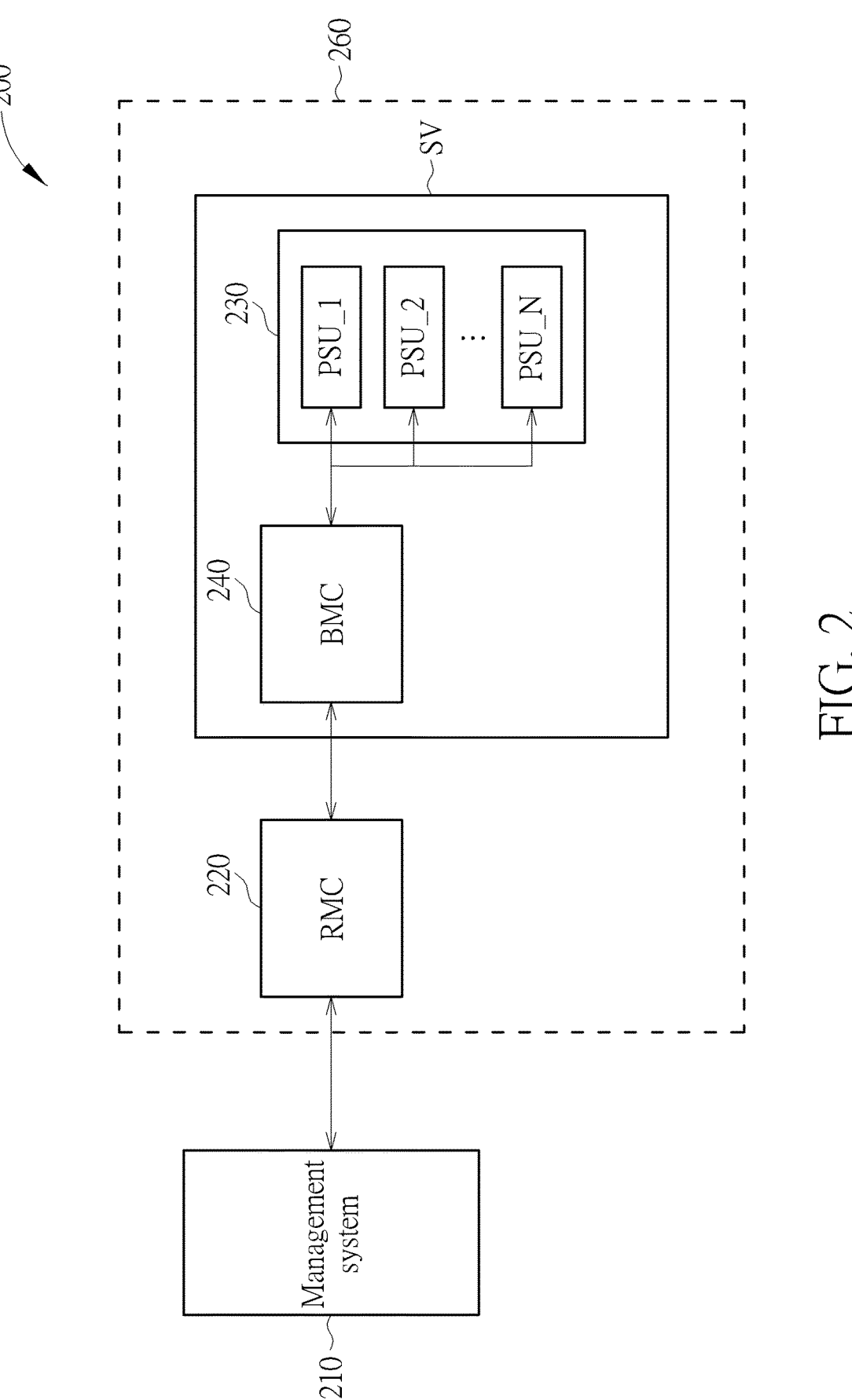
FIG. 2 is a diagram illustrating a system according to another embodiment of the present invention.

FIG. 2 is a diagram illustrating a system 200 according to another embodiment of the present invention. The system 200 may be a rack system which includes a management system 210, an RMC 220, and at least one server SV. The system 200 adopts a distributed power supplying structure, wherein each server SV includes a power supply 230 and a baseboard management controller (BMC) 240. The built-in power supply 230 of each server SV includes a plurality of power supply units PSU_1-PSU N (N is an integer larger than 1) for supplying its operation. In an embodiment of the present invention, the RMC 220 and the server SV may be implemented as the same rack/tank 260, but is not limited thereto.

FIG. 3 is a flowchart illustrating the operation of the systems 100 and 200 according to an embodiment of the present invention. The flowchart depicted in FIG. 3 includes the following steps:

Step 310: boot up the system.

Step 320: turn on all power supply units in the power supply.

Step 330: acquire a maximum output power value of the power supply and a conversion efficiency table of the power supply.

Step 340: calculate a real-time conversion efficiency of the power supply.

Step 350: determine whether the power supply is currently operating with an optimized conversion efficiency based on the conversion efficiency table of the power supply.

Step 360: adjust the number of turned-on power supply units in the power supply according to a predetermined rule.

As well-known to those skilled in the art, a system typically includes an operational fundamental structure (such as servers, internal memory and applications), a network fundamental structure (such as cables, switches and firewalls), a storage fundamental structure (such as block storage devices and file storage devices), and a support fundamental structure (such as a power subsystem, an uninterruptible power system, a backup power generator, ventilation and cooling equipment and a security system). For simplicity, only the structures associated with the present invention are shown in the system 100 depicted in FIG. 1 and in the system 200 depicted in FIG. 2.

The management systems 110 and 210 are main management consoles configured to manage resources in a centralized and collective manner during the operations of the systems 100 and 200, respectively. The management systems 110 and 210 may monitor the process requests, devices status and/or connectivity status of the systems 100 and 200 on a real-time basis, thereby allowing a user to manage the management systems 110 and 210 remotely. Each of the RMCs 120 and 220 may function as a hub for environment surveillance, asset locations, physical access and other information security/monitor sensors. However, the implementation of the management system 110 or 210 does not limit the scope of the present invention.

In an embodiment, each power supply unit in the power supply 130 or 230 has the same maximum output power value. In another embodiment, different power supply units in the power supply 130 or 230 may have different maximum output power values. However, the type and the specification of each power supply unit in the power supply 130 or 230 do not limit the scope of the present invention.

After the system 100 is booted up in step 310, the RMC 220 is configured to turn on all power supply units in the power supply 130 in step 320, thereby transmitting power to the servers SV_1-SV_M via the busbar 150. After the system 200 is booted up in step 310, the RMC 220 is configured to instruct the BMC 240 to turn on all power supply units in the built-in power supply 230 of the server SV in step 320, thereby supply power to the server SV.

The unlimited extraction of natural resources and the consequences of overlooking the environmental costs of such behavior have made more and more people aware of the importance of eco-design measures. Many frameworks have been established for the setting of eco-design requirements for energy-using products, such as consumer electronics, office equipment, household appliances, or power supplies. For example, for redundant power supplies certified for servers and systems (i.e., 230V internal redundant), the 80 Plus Titanium certification is acquirable for the power supply 130 or 230 when the minimum conversion efficiency of each power supply unit at least reaches 90%, 94%, 96% and 91% respectively at 10%, 20%, 50% and 100% of loading rates.

In the system 100 depicted in FIG. 1, the RMC 120 is configured to acquire the maximum output power value $P_{MAX}$ and the conversion efficiency table of the power supply 130 in step 330. In the system 200 depicted in FIG. 2, the RMC 220 is configured to acquire the maximum output power value $P_{MAX}$ and the conversion efficiency table of the power supply 230 via the BMC 240 of each server SV in step 330. The above-mentioned conversion efficiency table contains the relationship between the loading rate and the conversion efficiency of the power supply 130 or 230. For illustrative purpose, it is assumed that each power supply unit in the power supply 130 or 230 has acquired 80 Plus Titanium certification. Under such circumstance, the following Table 1 depicts the conversion efficiency table of the power supply 130 or 230 acquired in step 330, wherein the loading rate of the power supply is defined by the ratio of the requested output power of the power supply to its maximum output power value, and the conversion efficiency of the power supply is defined by the percentage of AC to DC conversion at a specific loading rate, i.e., the ratio of the real-time output power of the power supply to its maximum output power value.

TABLE 1

| loading rate of power supply | conversion efficiency of power supply |
|---|---|
| 0%-19% | 90% |
| 20%-37% | 94% |
| 38%-82% | 96% |
| 83%-100% | 91% |

As depicted in Table 1, when the loading rate of the power supply 130 or 230 is between 38% and 82%, the power supply 130 or 230 is able to operate with its optimized conversion efficiency of 96%, thereby reducing power consumption and heat dissipation. It is to be noted that different power supplies may have different conversion efficiency tables due to operation variations and environmental factors. The conversion efficiency table depicted in Table 1 is merely for illustrative purpose, but does not limit the scope of the present invention.

The maximum output power value $P_{MAX}$ of the power supply 130 or 230 is associated with the current number of turned-on power supply units. For illustrative purpose, it is assumed that each of the power supply 130 and 230 includes power supply units PSU_1-PSU_5 (i.e., N=5), each capable of providing a maximum output power value of 2500 W. Since all power supply units in the power supply 130 or 230 have been turned on in step 320, the maximum output power value $P_{MAX}$ acquired in step 330 is equal to 12500 W.

In the system 100 depicted in FIG. 1, the RMC 120 is configured to calculate the real-time conversion efficiency $P_{EFF}$ of the power supply 130 in step 340. In the system 200 depicted in FIG. 2, the RMC 220 is configured to calculate the real-time conversion efficiency $P_{EFF}$ of the power supply 230 in step 340. In an embodiment, the RMC 120 or the BMC 240 is configured to measure the average output power of the power supply 130 or 230 during a predetermined period (such as within 30 seconds) and provide the measured average output power of the power supply 130 or 230 as the real-time output power $P_{AV}$ of the power supply 130 or 230. Next, the RMC 120 or the BMC 240 is configured to calculate the real-time conversion efficiency $P_{EFF}$ of the power supply 130 or 230 based on the maximum output power value $P_{MAX}$ and the real-time output power $P_{AV}$, wherein $P_{EFF}=P_{AV}/P_{MAX}$.

In the system 100 depicted in FIG. 1, the real-time output power $P_{AV}$ of the power supply 130 at a specific time point is associated with the loading rates of the servers SV 1-SV_M. When the servers SV 1-SV_M consume more power, the real-time output power $P_{AV}$ of the power supply 130 is closer to its maximum output power value $P_{MAX}$, thereby resulting in a higher real-time conversion efficiency $P_{EFF}$. When the servers SV 1-SV_M consume less power, the difference between the real-time output power $P_{AV}$ of the power supply 130 and its maximum output power value $P_{MAX}$ becomes larger, thereby resulting in a lower real-time conversion efficiency $P_{EFF}$.

In the system 200 depicted in FIG. 2, the real-time output power $P_{AV}$ of the power supply 230 in each server SV at a specific time point is associated with the loading rate of each server SV. When the server SV consumes more power, the real-time output power $P_{AV}$ of the power supply 230 is closer to its maximum output power value $P_{MAX}$, thereby resulting in a higher real-time conversion efficiency $P_{EFF}$. When the server SV consume less power, the difference between the real-time output power $P_{AV}$ of the power supply 230 and its maximum output power value $P_{MAX}$ becomes larger, thereby resulting in a lower real-time conversion efficiency $P_{EFF}$.

In the system 100 depicted in FIG. 1, the RMC 120 is configured to determine whether the power supply 130 is currently operating with its optimized conversion efficiency based on the conversion efficiency table of the power supply 130 (such as Table 1) in step 350. In an embodiment, the power supply 130 may monitor the operation of the power supply units PSU_1-PSU N using its built-in controller (not shown in FIG. 1), and the RMC 120 may acquire the real-time workload of the power supply 130 (associated with the total power consumption of the servers SV_1-SV_M) directly from the power supply 130 and determine whether the power supply 130 is currently operating with its optimized conversion efficiency based on the real-time workload of the power supply 130. In another embodiment, the power supply 130 may receive power information of the servers SV_1-SV_M (such as the voltage, the current and the power consumption of each server) via the switch 140, acquire the real-time workload of the power supply 130 according to the power information of the servers SV_1-SV_M, and determine whether the power supply 130 is currently operating with its optimized conversion efficiency based on the real-time workload of the power supply 130. In an embodiment, the switch 140 may be a managed switch, but is not limited thereto.

In the system 200 depicted in FIG. 2, the RMC 220 is configured to determine whether the power supply 230 is currently operating with its optimized conversion efficiency based on the conversion efficiency table of the power supply 230 (such as Table 1) in step 350. In an embodiment, the power supply 230 may receive power information of each server SV (such as the voltage, the current and the power consumption of each server SV) via the BMC 240 of each server SV, acquire the real-time workload of the power supply 230 according to the power information of the server SV, and determine whether the power supply 230 is currently operating with its optimized conversion efficiency based on the real-time workload of the power supply 230.

When it is determined in step 350 that the power supply 130 or 230 is currently operating with its optimized conversion efficiency, steps 340 and 350 are executed again for continuously monitoring and determining the real-time conversion efficiency $P_{EFF}$ of the power supply 130 or 230. When it is determined in step 350 that the power supply 130 or 230 is not currently operating with its optimized conversion efficiency, step 360 is executed for adjusting the number of turned-on power supply units in the power supply 130 or 230 according to the predetermined rule, and then steps 340 and 350 are executed again for continuously monitoring and determining the real-time conversion efficiency $P_{EFF}$ of the power supply 130 or 230.

The following Table 2 illustrates the status of the RMC 100 or 200 at different time points during operation according to an embodiment of the present invention. For illustrative purpose, it is assumed that each of the power supplies 130 and 230 includes power supply units PSU_1-PSU_5 (i.e., N=5), each capable of providing a maximum output power value of 2500 W.

TABLE 2

| | time points | T1 | T2 | T3 | T4 | T5 | T6 | T7 |
|---|---|---|---|---|---|---|---|---|
| server | total power consumption | 6400 W | 1920 W | 1920 W | 1920 W | 1920 W | 4480 W | 4480 W |
| | loading rate | 100% | 30% | 30% | 30% | 30% | 70% | 70% |
| Power supply | PSU_1 (2500 W) | ON | ON | OFF | OFF | OFF | OFF | OFF |
| | PSU_2 (2500 W) | ON | ON | ON | OFF | OFF | OFF | OFF |

TABLE 2-continued

| time points | T1 | T2 | T3 | T4 | T5 | T6 | T7 |
|---|---|---|---|---|---|---|---|
| PSU_3 (2500 W) | ON | ON | ON | ON | OFF | OFF | ON |
| PSU_4 (2500 W) | ON | ON | ON | ON | ON | ON | ON |
| PSU_5 (2500 W) | ON | ON | ON | ON | ON | ON | ON |
| number of turned-on PSUs | 5 | 5 | 4 | 3 | 2 | 2 | 3 |
| maximum output power value | 12500 W | 12500 W | 10000 W | 7500 W | 5000 W | 5000 W | 7500 W |
| real-time output power value | 6400 W | 1920 W | 1920 W | 1920 W | 1920 W | 4480 W | 4480 W |
| loading rate | 51% | 15% | 19% | 26% | 38% | 90% | 60% |
| conversion efficiency | 96% | 90% | 90% | 94% | 96% | 91% | 96% |

At the time point T1 when step 350 is executed for the first time after system boot-up, since all power supply units in the power supply 130 or 230 have been turned on, the RMVC 120 or 220 may know that the maximum output power value $P_{MAX}$ of the power supply 130 or 230 is equal to 12500 W. Assuming that the servers SV_1-SV_M or the server SV operate with a full loading rate of 1000 (such as having a total power consumption of 6400 W), the real-time output power $P_{AV}$ of the power supply 130 or 230 is thus also equal to 6400 W. Under such circumstance, the actual loading rate of the power supply 130 or 230 is equal to about 51% when all 5 power supply units PSU_1-PSU_5 are turned on. Referring to the conversion efficiency table depicted in Table 1, the RMVC 130 or 230 may know that the power supply 130 or 230 is currently operating with its optimized conversion efficiency of 96% at 51% loading rate. Under such circumstance, steps 340 and 350 are directly executed again for continuously monitoring and determining the real-time conversion efficiency $P_{EFF}$ of the power supply 130 or 230.

At the time point T2 which occurs after the time point T1, it is assumed that the loading rate of the servers SV_1-SV_M or the server SV drops to 30% (such as having a total power consumption of 1920 W). Under such circumstance, the real-time output power $P_{AV}$ of the power supply 130 or 230 thus also drops to 1920 W, and the actual loading rate of the power supply 130 or 230 is equal to about 15% when all 5 power supply units PSU_1-PSU_5 are turned on (i.e. the maximum output power value is 12500 W). Referring to the conversion efficiency table depicted in Table 1, the RMC 130 or 230 may know that the power supply 130 or 230 is currently operating with 90% conversion efficiency at 15% loading rate instead of with its optimized conversion efficiency of 96%. Under such circumstance, step 360 is executed for decreasing or increasing the number of turned-on power supply units in the power supply 130 or 230 by 1. For example, by referring to the conversion efficiency table depicted in Table 1, the RMC 130 and 230 may determine that the power supply 130 or 230 needs to increase its loading rate in order to be able to operate with its optimized conversion efficiency. Therefore, the RMC 130 and 230 is configured to turn off the power supply unit PSU_1 having a maximum output power value of 2500 W. Next, steps 340 and 350 are executed again for continuously monitoring and determining the real-time conversion efficiency $P_{EFF}$ of the power supply 130 or 230.

At the time point T3 which occurs after the time point T2, it is assumed that the loading rate of the servers SV_1-SV_M or the server SV still remains at 30% (such as having a total power consumption of 1920 W). Under such circum-stance, the real-time output power $P_{AV}$ of the power supply 130 or 230 thus also remains equal to 1920 W, and the actual loading rate of the power supply 130 or 230 is about 19% when only 4 power supply units PSU_2-PSU_5 are turned on (i.e. the maximum output power value is 10000 W). Referring to the conversion efficiency table depicted in Table 1, the RMC 130 or 230 may know that the power supply 130 or 230 is currently operating with 90% conversion efficiency at 19% loading rate instead of with its optimized conversion efficiency of 96%. Under such circumstance, step 360 is executed again for decreasing or increasing the number of turned-on power supply units in the power supply 130 or 230 by 1. For example, by referring to the conversion efficiency table depicted in Table 1, the RMC 130 and 230 may determine that the power supply 130 or 230 needs to increase its loading rate in order to be able to operate with its optimized conversion efficiency. Therefore, the RMC 130 and 230 is configured to turn off the power supply unit PSU_2 having a maximum output power value of 2500 W. Next, steps 340 and 350 are executed again for continuously monitoring and determining the real-time conversion effi-ciency $P_{EFF}$ of the power supply 130 or 230.

At the time point T4 which occurs after the time point T3, it is assumed that the loading rate of the servers SV_1-SV_M or the server SV still remains at 30% (such as having a total power consumption of 1920 W). Under such circum-stance, the real-time output power $P_{AV}$ of the power supply 130 or 230 thus also remains equal to 1920 W, and the actual loading rate of the power supply 130 or 230 is about 26% when only 3 power supply units PSU_3-PSU_5 are turned on (i.e. the maximum output power value is 7500 W). Referring to the conversion efficiency table depicted in Table 1, the RMC 130 or 230 may know that the power supply 130 or 230 is currently operating with 94% conversion efficiency at 26% loading rate instead of with its optimized conversion efficiency of 96%. Under such circumstance, step 360 is executed again for decreasing or increasing the number of turned-on power supply units in the power supply 130 or 230 by 1. For example, by referring to the conversion efficiency table depicted in Table 1, the RMC 130 and 230 may determine that the power supply 130 or 230 needs to increase its loading rate in order to be able to operate with its optimized conversion efficiency. Therefore, the RMC 130 and 230 is configured to turn off the power supply unit PSU_3 having a maximum output power value of 2500 W. Next, steps 340 and 350 are executed again for continuously monitoring and determining the real-time conversion effi-ciency $P_{EFF}$ of the power supply 130 or 230.

At the time point T5 which occurs after the time point T4, it is assumed that the loading rate of the servers SV_1-SV_M or the server SV still remains at 30% (such as having a total power consumption of 1920 W). Under such circumstance, the real-time output power $P_{AV}$ of the power supply 130 or 230 thus also remains equal to 1920 W, and the actual loading rate of the power supply 130 or 230 is about 38% when only 2 power supply units PSU_4 and PSU_5 are turned on (i.e. the maximum output power value is 5000 W). Referring to the conversion efficiency table depicted in Table 1, the RMC 130 or 230 may know that the power supply 130 or 230 is currently operating with its optimized conversion efficiency of 96% at 38% loading rate. Under such circumstance, steps 340 and 350 are directly executed again for continuously monitoring and determining the real-time conversion efficiency $P_{EFF}$ of the power supply 130 or 230.

At the time point T6 which occurs later than the time point T5, it is assumed that the loading rate of the servers SV_1-SV_M or the server SV increases from 30% to 70% (such as having a total power consumption of 4480 W). Under such circumstance, the real-time output power $P_{AV}$ of the power supply 130 or 230 is thus also equal to 4480 W, At the time point T7 which occurs after the time point T6, it is assumed that the loading rate the servers SV 1-SV_M or the server SV remains at 70% (such as having a total power consumption of 4480 W). Under such circumstance, the real-time output power $P_{AV}$ of the power supply 130 or 230 thus also remains equal to 4480 W, and the actual loading rate of the power supply 130 or 230 is about 60% when only 3 power supply units PSU_3-PSU_5 are turned on (i.e. the maximum output power value is 7500 W). Referring to the conversion efficiency table depicted in Table 1, the RMC 130 or 230 may know that the power supply 130 or 230 is currently operating with its optimized conversion efficiency of 96% at 60% loading rate. Under such circumstance, steps 340 and 350 are directly executed again for continuously monitoring and determining the real-time conversion efficiency $P_{EFF}$ of the power supply 130 or 230.

The following Table 3 illustrates the status of the RMC 100 or 200 at different time points during operation according to another embodiment of the present invention. For illustrative purpose, it is assumed that each of the power supply 130 and 230 includes power supply units PSU_1-PSU_5 (i.e., N=5), each capable of providing a maximum output power value of 2500 W.

TABLE 3

| | time points | T1 | T2 | T3 | T4 | T5 |
|---|---|---|---|---|---|---|
| server | total power consumption | 6400 W | 1920 W | 1920 W | 2500 W | 2500 W |
| | loading rate | 100% | 30% | 30% | 39% | 39% |
| Power supply | PSU_1 (2500 W) | ON | ON | ON | ON | ON |
| | PSU_2 (2500 W) | ON | ON | OFF | OFF | OFF |
| | PSU_3 (2500 W) | ON | ON | OFF | OFF | OFF |
| | PSU_4 (2500 W) | ON | ON | OFF | OFF | OFF |
| | PSU_5 (2500 W) | ON | ON | OFF | OFF | OFF |
| | number of turned-on PSUs | 5 | 5 | 1 | 1 | 2 |
| | maximum output power value | 12500 W | 12500 W | 2500 W | 2500 W | 5000 W |
| | real-time output power value | 6400 W | 1920 W | 1920 W | 2500 W | 2500 W |
| | loading rate | 51% | 15% | 77% | 100% | 50% |
| | conversion efficiency | 96% | 90% | 96% | 91% | 96% | and the actual loading rate of the power supply 130 or 230 is about 90% when only 2 power supply units PSU_4 and PSU_5 are turned on (i.e. the maximum output power value is 5000 W). Referring to the conversion efficiency table depicted in Table 1, the RMC 130 or 230 may know that the power supply 130 or 230 is currently operating with 91% conversion efficiency at 90% loading rate instead of with its optimized conversion efficiency of 96%. Under such circumstance, step 360 is executed again for decreasing or increasing the number of turned-on power supply units in the power supply 130 or 230 by 1. For example, by referring to the conversion efficiency table depicted in Table 1, the RMC 130 and 230 may determine that the power supply 130 or 230 needs to lower its loading rate in order to be able to operate with its optimized conversion efficiency. Therefore, the RMC 130 and 230 is configured to turn on the power supply unit PSU_3 having a maximum output power value of 2500 W. Next, steps 340 and 350 are executed again for continuously monitoring and determining the real-time conversion efficiency $P_{EFF}$ of the power supply 130 or 230.

At the time point T1 when step 350 is executed for the first time after system boot-up, since all power supply units in the power supply 130 or 230 have been turned on, the RMC 120 or 220 may know that the maximum output power value $P_{MAX}$ of the power supply 130 or 230 is equal to 12500 W. Assuming that the loading rate of the servers SV_1-SV_M or the server SV is 1000 (such as having a total power consumption of 6400 W), the real-time output power $P_{AV}$ of the power supply 130 or 230 is thus also equal to 6400 W, and the actual loading rate of the power supply 130 or 230 is equal to 51% when all 5 power supply units PSU_1-PSU_5 are turned on (i.e. providing a maximum output power value of 10000 W). Referring to the conversion efficiency table depicted in Table 1, the RMVC 130 or 230 may know that the power supply 130 or 230 is currently operating with its optimized conversion efficiency of 96% at 51% loading rate. Under such circumstance, steps 340 and 350 are directly executed again for continuously monitoring and determining the real-time conversion efficiency $P_{EFF}$ of the power supply 130 or 230.

At the time point T2 which occurs after the time point T1, it is assumed that the loading rate of the servers SV_1-SV_M or the server SV has dropped to 30% (such as having a total power consumption of 1920 W). Under such circumstance, the real-time output power $P_{AV}$ of the power supply 130 or 230 thus also drops to 1920 W, and the actual loading rate of the power supply 130 or 230 is about 15% when all 5 power supply units PSU_1-PSU_5 are turned on (i.e. providing a maximum output power value of 12500 W). Referring to the conversion efficiency table depicted in Table 1, the RMC 130 or 230 may know that the power supply 130 or 230 is currently operating with 90% conversion efficiency at 15% loading rate instead of with its optimized conversion efficiency of 96%. Under such circumstance, step 360 is executed for decreasing or increasing the number of turned-on power supply units in the power supply 130 or 230 by a predetermined number based on a historical record. For example, by referring to the conversion efficiency table depicted in Table 1, the RMC 130 and 230 may determine that the power supply 130 or 230 needs to increase its loading rate in order to be able to operate with its optimized conversion efficiency. Also, according the historical record associated with the maximum output power value of each power supply unit recorded at previously turn-on or turn-off of each power supply unit, the RMC 130 and 230 may determine that the loading rate of the power supply 130 or 230 may be increased more efficiently and accurately by simultaneously turning off the power supply units PSU_2-PSU_5. Therefore, the RMC 130 OR 230 is configured to turn off the power supply units PSU_2-PSU_5 having a total maximum output power value of 10000 W. Next, steps 340 and 350 are executed again for continuously monitoring and determining the real-time conversion efficiency $P_{EFF}$ of the power supply 130 or 230.

At the time point T3 which occurs after the time point T2, it is assumed that the loading rate of the servers SV_1-SV_M or the server SV remains at 30% (such as having a total power consumption of 1920 W). Under such circumstance, the real-time output power $P_A$m of the power supply 130 or 230 thus also remains at 1920 W, and the actual loading rate of the power supply 130 or 230 is about 77% when only 1 power supply unit PSU_1 is turned on (i.e. providing a maximum output power value of 2500 W). Referring to the conversion efficiency table depicted in Table 1, the RMC 130 or 230 may know that the power supply 130 or 230 is currently operating with its optimized conversion efficiency of 96% at 77% loading rate. Under such circumstance, steps 340 and 350 are directly executed again for continuously monitoring and determining the real-time conversion efficiency $P_{EFF}$ of the power supply 130 or 230.

At the time point T4 which occurs after the time point T3, it is assumed that the loading rate of the servers SV 1-SV_M or the server SV increases to 39% (such as having a total power consumption of 2500 W). Under such circumstance, the real-time output power $P_A$m of the power supply 130 or 230 is thus also equal to 2500 W, and the actual loading rate of the power supply 130 or 230 is 100% when only 1 power supply unit PSU_1 (i.e. the maximum output power value is 2500 W). Referring to the conversion efficiency table depicted in Table 1, the RMC 130 or 230 may know that the power supply 130 or 230 is currently operating with 91% conversion efficiency at 100% loading rate instead of with its optimized conversion efficiency of 96%. Under such circumstance, step 360 is executed for decreasing or increasing the number of turned-on power supply units in the power supply 130 or 230 by a predetermined number based on a historical record. For example, by referring to the conversion efficiency table depicted in Table 1, the RMC 130 and 230 may determine that the power supply 130 or 230 needs to lower its loading rate in order to be able to operate with its optimized conversion efficiency. Also, according the historical record associated with the maximum output power value of each power supply unit recorded at previously turn-on or turn-off of each power supply, the RMC 130 and 230 may determine that the loading rate of the power supply 130 or 230 may be lowered more efficiently and accurately by simultaneously turning on the power supply units PSU_1 and PSU_2. Therefore, the RMC 130 or 230 is configured to turn on the power supply units PSU_1 and PSU_2 having a total maximum output power value of 5000 W. Next, steps 340 and 350 are executed again for continuously monitoring and determining the real-time conversion efficiency $P_{EFF}$ of the power supply 130 or 230.

At the time point T5 which occurs after the time point T4, it is assumed that the loading rate of the servers SV_1-SV_M or the server SV remains at 39% (such as having a total power consumption of 2500 W). Under such circumstance, the real-time output power $P_{AV}$ of the power supply 130 or 230 thus also remains at 25000 W, and the actual loading rate of the power supply 130 or 230 is about 50% when 2 power supply units PSU_1 and PSU_2 are turned on (i.e. providing a maximum output power value of 5000 W). Referring to the conversion efficiency table depicted in Table 1, the RMC 130 or 230 may know that the power supply 130 or 230 is currently operating with its optimized conversion efficiency of 96% at 50% loading rate. Under such circumstance, steps 340 and 350 are directly executed again for continuously monitoring and determining the real-time conversion efficiency $P_{EFF}$ of the power supply 130 or 230.

In conclusion, the system of the present invention is configured to monitor the loading status of the power supply on a real-time basis. When the loading rate of the power supply decreases in response to a smaller loading rate of the servers, the power supply is unable to operate with its optimized conversion efficiency, and a predetermined number of power supply units are thus turned off for increasing the loading rate of the power supply. When the loading rate of the power supply increases in response to a larger loading rate of the servers, the power supply is unable to operate with its optimized conversion efficiency, and a predetermined number of power supply units are thus turned on for decreasing the loading rate of the power supply. As shown by the rack/tank level (the embodiment depicted in FIG. 1) and the server level (the embodiment depicted in FIG. 2) loading status monitoring and loading rate adjustment, the present invention can ensure that the power supply continues to operate with its optimized conversion efficiency instead of being influenced by the loading rate variations of the servers, thereby reducing power consumption.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing power management in a system, the system including at least one server and a power supply which includes a plurality of power supply units, the method comprising:

turning on all power supply units in the power supply for supplying power to the at least one server;

acquiring a maximum output power value of the power supply and a conversion efficiency table of the power supply, wherein the conversion efficiency table contains a relationship between a loading rate of the power supply and a conversion efficiency of the power supply;

measuring an average output power of the power supply within a predetermined period;

dividing the average output power of the power supply by the maximum output power of the power supply for providing a real-time conversion efficiency of the power supply;

determining whether the power supply is currently operating with an optimized conversion efficiency based on the conversion efficiency table and the real-time conversion efficiency of the power supply; and adjusting a number of turned-on power supply units among the plurality of power supply units in the power supply according to a predetermined rule when determining that the power supply is not currently operating with the optimized conversion efficiency.

2. The method of claim 1, further comprising:

turning off or turning on any one power supply unit among the plurality of power supply units in the power supply when determining that the power supply is not currently operating with the optimized conversion efficiency; and re-calculating the real-time conversion efficiency of the power supply after turning off or turning on the any one power supply unit for determining whether the power supply is currently operating with the optimized conversion efficiency.

3. The method of claim 1, further comprising:

turning off or turning on a predetermined number of power supply units among the plurality of power supply units in the power supply according to a historical record associated with a maximum output power value of each power supply unit when determining that the power supply is not currently operating with the optimized conversion efficiency; and re-calculating the real-time conversion efficiency of the power supply after turning off or turning on the predetermined number of power supply units for determining whether the power supply is currently operating with the optimized conversion efficiency.

4. A system, comprising:

a plurality of servers;

a power supply comprising a plurality of power supply units;

a rack management controller (RMC) configured to:

turn on all power supply units in the power supply for supplying power to the plurality of servers after booting-up the system;

acquire a maximum output power value of the power supply and a conversion efficiency table of the power supply, wherein the conversion efficiency table contains a relationship between a loading rate of the power supply and a conversion efficiency of the power supply;

measure an average output power of the power supply within a predetermined period;

divide the average output power of the power supply by the maximum output power of the power supply for providing a real-time conversion efficiency of the power supply;

determine whether the power supply is currently operating with an optimized conversion efficiency based on the conversion efficiency table and the real-time conversion efficiency of the power supply; and adjust a number of turned-on power supply units among the plurality of supply units in the power supply according to a predetermined rule when determining that the power supply is not currently operating with the optimized conversion efficiency.

5. The system of claim 4, further comprising:

a busbar coupled to the plurality of servers and the power supply and configured to transmit the power supplied by the power supply to the plurality of servers.

6. The system of claim 4, further comprising:

a switch coupled between the rack management controller and the plurality of servers.

7. The system of claim 4, wherein the rack management controller is further configured to:

turn off or turn on any one power supply unit among the plurality of power supply units in the power supply when determining that the power supply is not currently operating with the optimized conversion efficiency; and re-calculate the real-time conversion efficiency of the power supply after turning off or turning on the any one power supply unit for determining whether the power supply is currently operating with the optimized conversion efficiency.

8. The system of claim 4, wherein the rack management controller is further configured to:

turn off or turn on a predetermined number of power supply units among the plurality of power supply units in the power supply according to a historical record associated with a maximum output power value of each power supply unit when determining that the power supply is not currently operating with the optimized conversion efficiency; and re-calculate the real-time conversion efficiency of the power supply after turning off or turning on the predetermined number of power supply units for determining whether the power supply is currently operating with the optimized conversion efficiency.

9. A system, comprising:

at least one server, comprising:

a power supply comprising a plurality of power supply units; and a baseboard management controller (BMC) configured to control an operation of each power supply unit in the power supply for supplying power to the at least one server; and a rack management controller (RMC) configured to:

acquire a maximum output power value of the power supply and a conversion efficiency table of the power supply via the baseboard management controller, wherein the conversion efficiency table contains a relationship between a loading rate of the power supply and a conversion efficiency of the power supply;

measure an average output power of the power supply within a predetermined period;

divide the average output power of the power supply by the maximum output power of the power supply for providing a real-time conversion efficiency of the power supply;

determine whether the power supply is currently operating with an optimized conversion efficiency based on the conversion efficiency table and the real-time conversion efficiency of the power supply; and instruct the baseboard management controller to adjust a number of turned-on power supply units among the plurality of supply units in the power supply according to a predetermined rule when determining that the power supply is not currently operating with the optimized conversion efficiency.

10. The system of claim 9, wherein the rack management controller is further configured to:

instruct the baseboard management controller to turn off or turn on any one power supply unit in the power supply when determining that the power supply is not currently operating with the optimized conversion efficiency; and re-calculate the real-time conversion efficiency of the power supply after instructing the baseboard management controller to turn off or turn on the any one power supply unit for determining whether the power supply is currently operating with the optimized conversion efficiency.

11. The system of claim 9, wherein the rack management controller is further configured to:

instruct the baseboard management controller to turn off or turn on a predetermined number of power supply units in the power supply according to a historical record associated with a maximum output power value of each power supply unit when determining that the power supply is not currently operating with the optimized conversion efficiency; and re-calculate the real-time conversion efficiency of the power supply after instructing the baseboard management controller to turn off or turn on the predetermined number of power supply units for determining whether the power supply is currently operating with the optimized conversion efficiency.

\* \* \* \* \*